(No Model.)
T. H. CHUBB.
FISHING REEL.
No. 370,684. Patented Sept. 27, 1887.
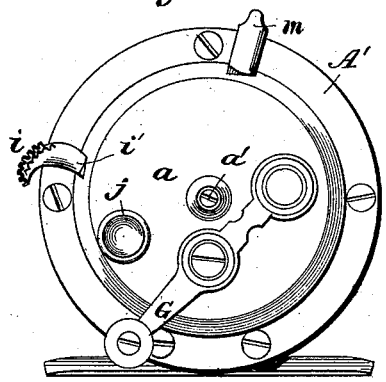
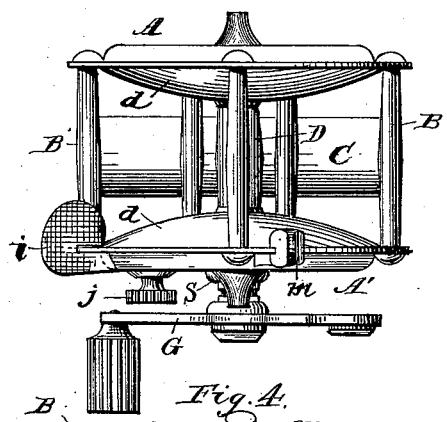
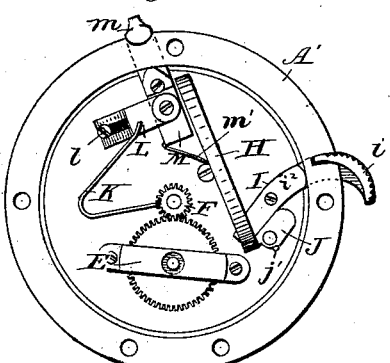
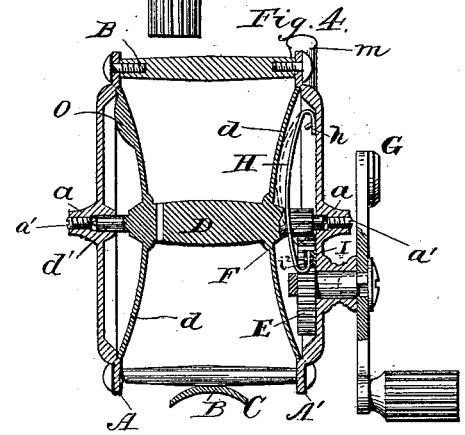
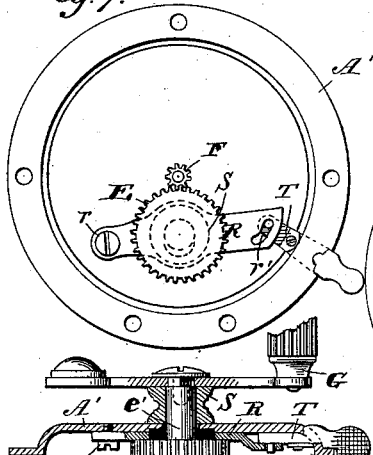
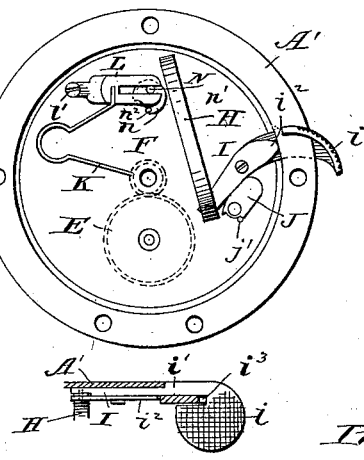
Witnesses:
Inventor:
Thomas H. Chubb,
by H. N. Low,
Attorney

UNITED STATES PATENT OFFICE.

THOMAS HENRY CHUBB, OF POST MILLS, VERMONT.

FISHING-REEL.

SPECIFICATION forming part of Letters Patent No. 370,684, dated September 27, 1887.

Application filed June 17, 1887. Serial No. 241,641. (No model.)

*To all whom it may concern:*

Be it known that I, THOMAS HENRY CHUBB, a citizen of the United States, residing at Post Mills, in the county of Orange and State of Vermont, have invented certain new and useful Improvements in Fishing-Reels; and I do declare the following to be a full, clear, and exact description of the invention, such as will enable others skilled in the art to which it appertains to make and use the same.

The object of my invention is to produce a fishing-reel having certain new and convenient features of construction and operation, hereinafter more fully set forth.

My invention relates more especially to the devices whereby a brake or drag may be applied to the reel proper to check its speed or tire a hooked fish, and to the mechanism by which the reel may be at will converted from a freely and silently running to a click-reel, and vice versa.

In order to enable my invention to be more readily understood I have shown in the accompanying drawings a means for carrying it into effect.

In said drawings, Figure 1 is a side view of a fishing-reel embodying my invention. Fig. 2 is a plan view of the same. Fig. 3 is an elevation of the inner face of the reel-plate which carries the drag and click mechanism. Fig. 4 is a sectional view. Fig. 5 is a detail view showing a modification. Fig. 6 is a sectional view showing the mode of securing one of the levers which project through the case. Fig. 7 is an elevation of a portion of the reel, showing a means for throwing the multiplying-gear in and out of engagement. Fig. 8 is a sectional view of the same.

A A' indicate the side plates of the reel, B the transverse pins or braces by which the plates are secured together, and C the seat by which the reel is adapted to be attached to the fishing-rod.

The reel proper, consisting of the axis D and heads or disks $d\ d$, is mounted by its journals $d'\ d'$ in bearings $a$ in the side plates. The journals are conical at their ends, with their apexes abutted by adjusting-screws $a'$ in the bearings $a$. By this arrangement the reel proper will run very freely in its bearings and with a minimum of friction, while at the same time, by a proper adjustment of screws $a'$, there will not be the slightest appreciable looseness or rattling.

Upon one side of the reel, preferably for convenience and economy of manufacture upon both, the disk $d$ and contiguous side plate (in the construction shown the plate A') are so shaped as to leave between them a space or chamber within which is situated the principal parts of the mechanism about to be described.

E is a gear-wheel mounted in suitable bearings upon the inner face of plate A' and adapted to mesh with and actuate a small pinion, F, upon the axis D of the reel proper. By the hand-crank G on the axis of wheel E the reel proper may be rotated in the usual manner several times to each revolution of the hand.

I may here state that, although I have illustrated and described a multiplying-reel, my improvements are in the main applicable to a single or direct acting reel.

The brake or drag is applied at will to the reel proper by the following devices:

H is a bow-spring bent around at its ends, one of which by an aperture engages with a stud, $h$, on the plate A', and the other end of which is pivoted to the drag-lever I. The latter is mounted pivotally in or upon the plate A', and is provided with a projecting end having a finger or thumb piece, $i$, situated, so as to be conveniently operated by the hand which holds the rod, immediately below the reel. By preference the drag-lever is pivoted in the following manner, which leaves practically no opening into the inclosed space already referred to, which contains the drag and click mechanisms, with the result of protecting the latter from dirt and water: The plate A' is provided with an opening near its edge, which opening the drag-lever neatly fits, abutting shoulders $i'\ i^2$, one of which is removable, (preferably the inner one, $i^2$,) keeping the lever in position. The thumb-piece $i$ is by preference slotted, as at $i^3$, to engage with the periphery of the plate A', thereby steadying the lever in its position and action and preventing the thumb-piece from being accidentally caught and broken off. By pressing the thumb-piece in the proper direction the inner end of the drag-lever is caused to approach the stud h, thereby causing the bow-spring H to buckle or spring inward at its center and press against the contiguous reel-disk d, with the effect of checking the revolution of the reel or putting a drag upon the line. By the pressure of the thumb the degree of drag may be regulated at will; but I have also provided means whereby a fixed amount of drag may be applied and maintained without continued pressure of the thumb. J is a cam carried by an axis journaled in the plate A′, which axis is provided with an operating-head, j. The cam is adapted to bear against the drag-lever I and force the latter into such position as to bend the spring H inward, as already described. When the cam is so forced against the drag-lever far enough to be on its dead-center, the hand may be removed from the head j, and the parts will remain in the said position till the cam is again turned and the lever released. The movement of the cam may be regulated or stopped by a pin, j′, as shown.

The thumb-piece i may be entirely dispensed with when the cam J is provided; but I prefer to retain the former, as by it a variable drag may be applied.

The click-spring is shown at K, and is by preference of U or V shape. It is carried by a movable or adjustable slide or lever, L, which is adapted to be operated from the outer side of the reel, to engage the spring with or disengage it from the click-ratchet. In a multiplying-reel such as that shown one of the gear-wheels may be conveniently utilized to perform the function of such ratchet.

The part L, carrying the click-spring, may be operated in various ways. In the construction shown in the first four figures it is mounted to slide upon a guide or pin, l, carried by the plate A′, and is pivoted at its other end to a lever, M, having a finger or thumb piece, m. The lever is mounted to oscillate in an aperture in the plate A′ in a manner similar to the drag-lever I. It is, moreover, held in each of its extreme positions with the click-spring in or out of engagement with pinion F, as may be desired, by a retaining-spring, m′.

In the construction shown in Fig. 5 the part L is pivoted at l′ to plate A′ and is adapted to be oscillated by a cam or crank movement, preferably arranged to be on the dead-center when the click-spring is engaged, thus obviating the necessity for the retaining-spring m′. In the particular construction shown a crank-movement is employed, the crank-pin N engaging a slot in the part L and being carried by a crank-disk, n, the arbor of which passes through the plate A′ and is adapted to be rotated by a head, n′. The disk n is provided with shoulders which engage a stop-pin, n², to limit the movement of the disk and click-spring.

O is a weight attached to the reel proper to balance the same and give it evenness of motion.

With the construction above described may be combined a means for throwing the multiplying-gear into and out of engagement. Such an arrangement is shown in Figs. 7 and 8, in which the gear-wheel E is movable toward and from the pinion F. The movable bearing for the gear-wheel is preferably furnished by a lever, R, pivoted to the side plate at r and carrying a bearing for the shaft c′ of the wheel, which shaft passes through the side plate, thence through a sleeve, S, which abuts the outer face of the plate and beyond the sleeve receives the hand-crank G. The base of the sleeve effectually closes the aperture in the side plate through which the shaft passes. The other end of lever R has a slot, r′, engaged by a pin on a thumb-lever, T, mounted pivotally in the side plate. The slot and lever T are so arranged that pressure upon wheel E or lever R will not move the former lever when the pin is in the upper end of slot r′; but by shifting lever T and carrying the pin to the lower end of the slot the lever R may be released and moved with wheel E away from pinion F. A reverse movement effects the re-engagement.

The lever T may be held normally up by a spring, if desired, or may be held in either of its two positions by a spring similar to spring m′.

Having thus described my invention, what I claim, and desire to secure by Letters Patent of the United States, is—

1. In a fishing-reel, the combination, with the reel-plate and the reel proper, of a bow-spring situated between said parts, secured at one end to the reel-plate, and having its convex surface turned toward and adapted to engage the reel, and devices, substantially as described, connected with the other end of the spring, for compressing the same, as and for the purpose set forth.

2. In a fishing-reel, the combination, with the reel-plate having a radial opening in its edge, the reel proper forming with said plate an inclosed space, and the click, drag, or analogous mechanism situated in said space, of a lever for operating said mechanism passing into said space through said opening, lying and adapted to oscillate parallel with the plate, and having its pivotal point immediately in the opening.

3. In a fishing-reel, the combination, with the reel-plate, the reel proper, and its click ratchet or gear wheel, of a click-spring adapted to engage the latter, a part, M, supported on the reel-plate carrying the spring and movable toward or from the ratchet or wheel, and a lever connected with the part M and extending to the outer side of the plate for operating the said part.

4. In a fishing-reel, the combination, with the reel-plate, the reel proper, and its click ratchet or gear wheel, of a click-spring adapted to engage the latter, a part, M, supported on the reel-plate carrying the spring and movable toward or from the ratchet-wheel, a lever connected with the part M and extending to the outer side of the plate for operating the said part, and a retaining-spring, m, adapted to maintain said part in the position to which it may be adjusted.

5. The combination, with the reel-plate having a radial opening in its edge, the reel proper forming with said plate an inclosed space, and the click, drag, or analogous mechanism situated in said space, of a lever for operating said mechanism passing into said space through the said opening, and having shoulders which abut, respectively, the outer and the inner sides of the opening, whereby the lever is pivoted immediately in and occludes the opening.

6. The combination, with the reel-plate, the reel proper, and the click, drag, or analogous mechanism applied to the reel, of a lever for operating said mechanism, pivoted to and adapted to oscillate parallel to the plate, and having a re-entering slot fitted and operating upon the periphery of the reel-plate.

7. The combination, with the reel-plate, the reel proper, and its click ratchet or gear wheel, of a click-spring adapted to engage the latter, a part, M, supported upon the reel-plate carrying the spring and movable toward or from the ratchet or gear wheel, a shaft extending through the reel-plate, and a crank and pin carried by said shaft and engaging the part M.

8. The combination, with the reel-plate and the reel proper, of a drag-spring adapted when compressed to bear against the reel-head, a drag-lever pivoted to the reel-plate parallel with the same and connected with the drag-spring for compressing the same, and a cam or eccentric mounted on the reel-plate, situated in line with the lever, and adapted to engage the latter to hold the spring compressed.

9. The combination, with the reel proper and its actuating-pinion, of a gear-wheel engaging the latter, a lever pivoted to the reel-plate and carrying the gear-wheel, and a second lever pivoted on the plate and extending to the outer side of the same, said levers having a pin-and-slot connection whereby the gear-wheel is maintained in engagement with the pinion against the pressure of the latter.

In testimony whereof I affix my signature in the presence of two witnesses.

THOMAS HENRY CHUBB.

Witnesses:
  E. T. HART,
  THOS. B. CHUBB.